W. LOTTRIDGE.
HARVESTER
No. 181,953.   Patented Sept. 5, 1876.
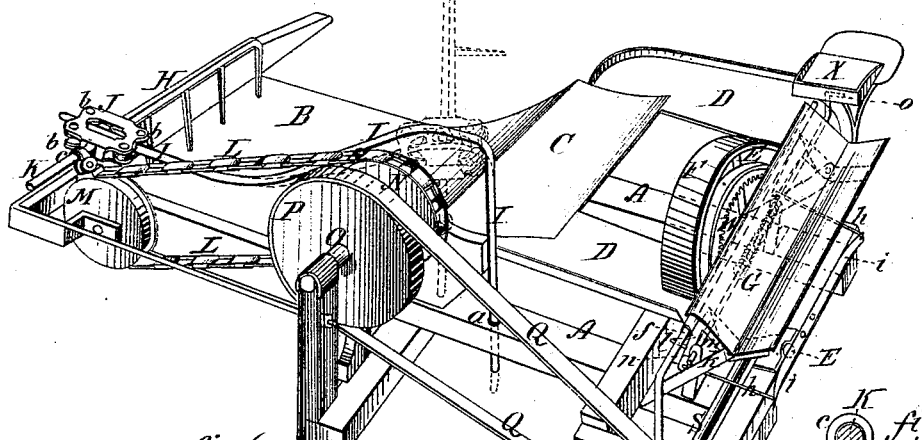
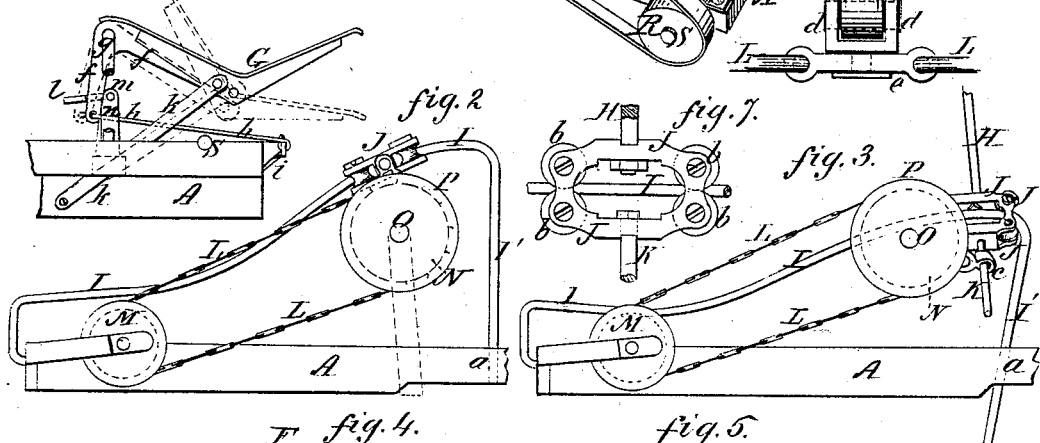
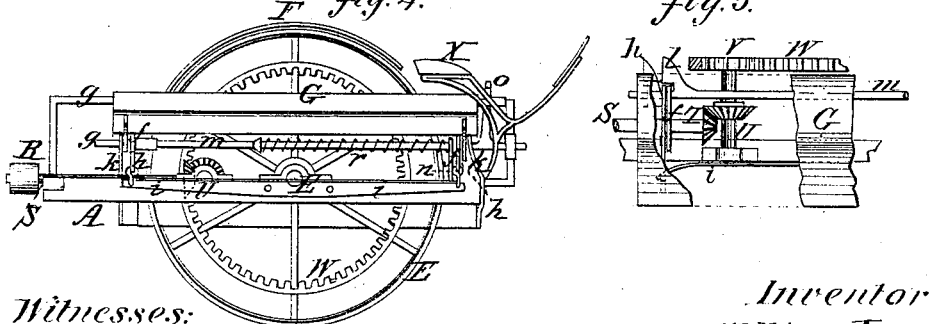
Witnesses:
Inventor:
pro William Lottridge,
Johnson and Johnson,
Attorneys.

UNITED STATES PATENT OFFICE.

WILLIAM LOTTRIDGE, OF OSAGE, IOWA, ASSIGNOR OF TWO-THIRDS HIS RIGHT TO MARTIN V. NICHOLS, OF SAME PLACE.

IMPROVEMENT IN HARVESTERS.

Specification forming part of Letters Patent No. 181,953, dated September 5, 1876; application filed January 4, 1876.

*To all whom it may concern:*

Be it known that I, WILLIAM LOTTRIDGE, of Osage, in the county of Mitchell and State of Iowa, have invented a new and useful Improvement in Harvesting-Machine, of which the following is a specification:

My invention relates to certain improvements in that class of harvesting-machines in which the cut grain is conveyed to a receptacle, and afterward bound by hand by persons riding upon the machine; and the nature of said invention will be fully understood from the following description, in connection with accompanying drawings, in which—

Figure 1 represents a view in perspective, looking toward the rear, showing the rake in raking position upon the platform; Fig. 2, a rear-side view, showing the rake-head and its guide-rod, elevated to pass over the pulley in delivering the cut grain; Fig. 3, a similar view, showing the rake elevated and its guide-rod down when the rake is returning to the outer end of the platform; Fig. 4, a side view, showing the bundle-receptacle; Fig. 5, a detail of the gearing for operating it, and Fig. 6 an end view; Fig. 7, the rake-carriage, and Fig. 8 the swiveling chain attachment for the rake.

The main frame of the machine is indicated by A, and B is the platform, on which the cut grain falls. This platform mechanism is imperforate, and extends continuously, first horizontally to the inner end of the finger-bar, and thence upward in an inclined plane to the grain-receiver C. This platform I prefer to make of sheet metal. D D are the binders' tables arranged between the grain-receiver C and the single driving-wheel E, which is partially covered with a shield, F, to protect the persons of the binders from injury.

The object of the arrangement of the grain-receiver and the binders' tables on the inner or cutting side of the driving-wheel is to diminish the height to which it is necessary to elevate the grain. In those machines where the grain is delivered over and beyond the driving-wheel this is an important disadvantage. On the outside of the driving-wheel is the tilting sheaf-receptacle G, to be hereinafter more fully described.

H is the rake, the head of which moves upon a guide-rod, I, the outer end of which is rigidly secured to the frame of the machine. This rod is bent to conform to the horizontal and inclined portions of the platform B. The inner end of the rod I is bent to form a vertical limb, I', as shown, which limb is free to play vertically in a perforation at $a$ in the framing, so that the rod I may be free to yield upward at a certain point to relieve the tension of the endless chain carrying the rake, and downward when said rake has reached the upper end of its course to permit it to change its position without throwing too much strain and friction upon the operating parts. The head of the rake H is provided with a carriage, J, within which are journaled friction-rolls $b\ b\ b\ b$, having concave rims, and arranged to hug the round rod I, and maintain the rake-head at a right angle with said rod I. Projecting from this carriage J, on the opposite side thereof from the rake-head, and in a line with the rake-head, is a rod or arm, K, which has free play longitudinally in a collar, $c$, fitting thereon, which is journaled in a staple, $d$, Fig. 8, which, again, is swiveled in a link, $e$, of the endless chain L, which passes, at the outer end of the platform, over pulley M, and at the inner end over a sprocket-wheel, N, rigidly secured upon shaft O, to the other end of which is also rigidly secured the large pulley P, deriving its motion, through belt Q, from the pulley R on the shaft S. At the other end of the shaft S is a bevel-pinion, T, gearing with a bevel-pinion on a short shaft, U, carrying at the other end a pinion, V, meshing with the internal gear W on the main driving-wheel E.

The operation of my rake is as follows: As the rake moves along the platform and up the inclined portion thereof, it maintains its contact therewith until reaching the edge of the grain-receiver C. The sprocket-wheel N is so situated, with reference to the grain-receiver, that the link $e$, to which the loose collar $c$ is secured, begins to pass downward over the sprocket-wheel just as the rake reaches the receiver and delivers the grain thereto, so that the arm K is depressed, and the rake is raised to a nearly perpendicular position, as shown by dotted lines in Fig. 1, which position it maintains throughout its return movement to the outer end of the platform, where the ascent of link e and its swivel-collar c over pulley M depresses the rake-head to working position. The arm K being free to play through the collar c, and the guide-rod I having vertical motion, (the weight of the rake-head tending to depress it at this point in the movement,) the parts all tend to work smoothly and without obstruction. The concave grain-receptacle G is supported by loose connections or links $k$ $k$, pivoted to it at its inner side at each end; and is also centrally pivoted at each end to one arm of an elbow-lever, $f$, fulcrumed on a rod, $g$, Fig. 6. The other arms of these elbow-levers are each connected by rods or links $h$ to a spring, $i$, which tends to draw the rods outwardly. When the receptacle G is empty the tension of the spring $i$ is sufficient to maintain it in a horizontal or receiving position. It is, however, positively held in position until loaded with bundles, by means of catches $l$ engaging with the elbow-levers $f$, and preventing the downward movement of the receptacle. These catches are rigidly secured to a rod, $m$, sliding in bearings $n$ $n$ on the main frame. The other end of the rod has a foot-piece, $o$, rigidly secured to it, and in easy reach of the foot of the driver on his seat X. When the foot-piece $o$ is pushed forward the catches $l$ are withdrawn from engagement with the elbow-levers $f$, and the weight of the bundles in the receiver tilts it, throwing them off upon the ground. The tension of the spring $i$ restores the unloaded receiver to its normal position. When the driver removes his foot from the foot-piece $o$ a reacting spring, $r$, coiled around the rod, and acting between a shoulder formed thereon and the forward bearing, throws the rod back, so that the catches again engage with the elbow-levers $f$. The tilted position of the receiver is shown by dotted lines in Fig. 6.

I claim—

1. The combination, with a continuous imperforate platform, B, having an upwardly-inclined delivering-side, and a bent guide-rod, I, having an automatic rising-and-falling movement, of the rake H, pivoted at one end, and arranged and operated to conform automatically to said platform in delivering the grain therefrom.

2. The bent guide-rod I, in combination with the endless chain L and the pivoted rake H, substantially as and for the purpose stated.

3. The combination of the rake H, having arm K, the guide-rod I, and the endless chain L, of the pivoted and swiveling collar $c$ and staple $d$, substantially as and for the purpose set forth.

4. In combination with a rake deriving its motion from an endless chain, the guide-rod I, having its outer end rigidly secured to the frame of the machine, and its inner end free to play vertically, substantially as and for the purpose set forth.

5. The combination of the bundle-receiver, the pivoted connections $k$, elbow-levers $f$, and retracting-springs $i$, as described.

6. The combination, with the sliding rod $m$, formed with catches $l$, foot-piece $o$, and reacting spring $r$, of the elbow-lever $f$, pivoted bundle-receiver G, and pivoted connections $k$ $k$, substantially as and for the purpose set forth.

In testimony that I claim the foregoing I have affixed my signature in the presence of two witnesses.

WILLIAM LOTTRIDGE.

Witnesses:
 J. H. ARMSTRONG,
 JOS. KELLOY.